United States Patent
Keller et al.

(10) Patent No.: US 10,602,070 B2
(45) Date of Patent: Mar. 24, 2020

(54) VARIABLE MAGNIFICATION ACTIVE IMAGING SYSTEM

(71) Applicant: RAYTHEON COMPANY, Waltham, MA (US)

(72) Inventors: Sean D. Keller, Tucson, AZ (US); Gerald P. Uyeno, Tucson, AZ (US)

(73) Assignee: RAYTHEON COMPANY, Waltham, MA (US)

(*) Notice: Subject to any disclaimer, the term of this patent is extended or adjusted under 35 U.S.C. 154(b) by 174 days.

(21) Appl. No.: 15/008,006

(22) Filed: Jan. 27, 2016

(65) Prior Publication Data

US 2017/0214858 A1 Jul. 27, 2017

(51) Int. Cl.
*H04N 5/232* (2006.01)
*H04N 5/225* (2006.01)
*H04N 5/345* (2011.01)

(52) U.S. Cl.
CPC ....... *H04N 5/23296* (2013.01); *H04N 5/2256* (2013.01); *H04N 5/2259* (2013.01); *H04N 5/23241* (2013.01); *H04N 5/345* (2013.01)

(58) Field of Classification Search
CPC .. H04N 5/2251; H04N 5/2256; H04N 5/2259; H04N 5/2354; H04N 5/238; H04N 5/345; H04N 5/353; H04N 5/378
USPC .............................................. 348/296, 240.3
See application file for complete search history.

(56) References Cited

U.S. PATENT DOCUMENTS

| | | |
|---|---|---|
| 4,625,108 A | 11/1986 | Nestel et al. |
| 4,653,905 A | 3/1987 | Farrar et al. |
| 4,810,088 A | 3/1989 | Karning et al. |
| 4,965,453 A | 10/1990 | Hoschette et al. |
| 5,005,979 A | 4/1991 | Sontag et al. |
| 5,438,873 A | 8/1995 | Wlodarczyk et al. |

(Continued)

FOREIGN PATENT DOCUMENTS

WO 2014200581 A2 12/2014

OTHER PUBLICATIONS

Ayral et al., "Phase-Conjugate Nd:YAG Laser with Internal Acousto-Optic Beam Steering", Optics Letters, vol. 16, No. 16, Aug. 15, 1991, pp. 1225-1227.

(Continued)

*Primary Examiner* — Sinh Tran
*Assistant Examiner* — Zhenzhen Wu
(74) *Attorney, Agent, or Firm* — Lando & Anastasi, LLP

(57) ABSTRACT

Imaging systems and a method of generating an image. One example of an imaging system includes a detection subsystem including a focal plane array (FPA) coupled to a read-out integrated circuit (ROIC), the ROIC being configured to activate a portion of the FPA in a selected pattern during an integration period, an optical scanning subsystem including an optical source and a waveguide, the waveguide being configured to direct optical radiation generated by the optical source within a field of view of the detection subsystem and over an area of a scene, the portion of the FPA activated in the selected pattern corresponding to the area of the scene, and an adaptive polymer lens assembly positioned at an aperture of the imaging system shared by the detection subsystem and the optical scanning subsystem, the adaptive polymer lens assembly being configured to adjust an optical magnification of the scene.

20 Claims, 4 Drawing Sheets

(56) References Cited

U.S. PATENT DOCUMENTS

| | | | |
|---|---|---|---|
| 6,163,372 | A | 12/2000 | Sallee et al. |
| 6,175,383 | B1 | 1/2001 | Yadid-Pecht et al. |
| 6,215,593 | B1 | 4/2001 | Bruce |
| 6,507,685 | B1 | 1/2003 | Polynkin et al. |
| 6,943,873 | B2 | 9/2005 | Sallee |
| 6,950,570 | B1 | 9/2005 | Novotny |
| 7,376,314 | B2 | 5/2008 | Reininger |
| 7,575,190 | B2 | 8/2009 | Sallee |
| 7,583,364 | B1 | 9/2009 | Mayor et al. |
| 7,626,152 | B2 | 12/2009 | King et al. |
| 7,745,771 | B2 | 6/2010 | Troxell et al. |
| 7,760,334 | B1 | 7/2010 | Evans |
| 7,786,418 | B2 | 8/2010 | Taylor et al. |
| 8,035,822 | B2 | 10/2011 | Riza et al. |
| 8,081,301 | B2 | 12/2011 | Stann et al. |
| 8,237,835 | B1 | 8/2012 | Muller |
| 8,294,879 | B2 | 10/2012 | Silny et al. |
| 8,351,114 | B2 | 1/2013 | Nelson et al. |
| 8,368,792 | B2 * | 2/2013 | Xu .................. H04N 3/1562 348/294 |
| 8,380,025 | B2 | 2/2013 | Anderson et al. |
| 8,400,619 | B1 | 3/2013 | Bachrach et al. |
| 8,463,080 | B1 | 6/2013 | Anderson et al. |
| 8,488,253 | B2 | 7/2013 | Wakazono et al. |
| 8,817,271 | B1 | 8/2014 | Geary |
| 8,970,740 | B2 | 3/2015 | Herman et al. |
| 8,989,523 | B2 | 3/2015 | Anderson et al. |
| 2002/0113194 | A1 | 8/2002 | Hu et al. |
| 2003/0183746 | A1 | 10/2003 | Chen |
| 2005/0237530 | A1 * | 10/2005 | Schnittker .......... G01N 21/55 356/445 |
| 2005/0271325 | A1 | 12/2005 | Anderson et al. |
| 2009/0015658 | A1 | 1/2009 | Enstad et al. |
| 2009/0142066 | A1 | 6/2009 | Leclair et al. |
| 2009/0278932 | A1 | 11/2009 | Yi |
| 2010/0128221 | A1 | 5/2010 | Muller et al. |
| 2011/0164330 | A1 | 7/2011 | Henriksen et al. |
| 2011/0181767 | A1 | 7/2011 | Neutzler et al. |
| 2013/0021474 | A1 | 1/2013 | Taylor et al. |
| 2013/0044309 | A1 | 2/2013 | Dakin et al. |
| 2013/0100538 | A1 | 4/2013 | Kim |
| 2013/0301877 | A1 * | 11/2013 | Ito ......................... G06T 7/20 382/103 |
| 2014/0152793 | A1 | 6/2014 | Staker et al. |
| 2014/0190666 | A1 | 7/2014 | Schlie et al. |
| 2015/0185454 | A1 | 7/2015 | Kalkbrenner et al. |
| 2015/0207990 | A1 | 7/2015 | Ford et al. |
| 2015/0285625 | A1 * | 10/2015 | Deane .................. G01S 17/10 348/140 |
| 2016/0006914 | A1 | 1/2016 | Neumann |
| 2016/0182788 | A1 * | 6/2016 | Wan .................. H04N 5/23219 348/370 |
| 2016/0182892 | A1 * | 6/2016 | Ko .................. H04N 13/0253 348/46 |
| 2016/0309065 | A1 | 10/2016 | Karafin et al. |
| 2018/0081182 | A1 | 3/2018 | Takahashi et al. |

OTHER PUBLICATIONS

Chiu et al., "Shape-Optimized Electrooptic Beam Scanners: Analysis, Design, and Simulation", IEEE, Journal of Light Nave Technology, vol. 17, No. 1, Jan. 1999, pp. 108-114.

Kim et al., "Wide-Angle, Nonmechanical Beam Steering Using Thin Liquid Crystal Polarization Gratings", Proc. of SPIE, vol. 7093, 2008.

Santiago, et al., "Adaptive Polymer Lens for Rapid Zoom Shortwave Infrared Imaging Applications", Optical Engineering, SPIE Digital Library, Dec. 2014, pp. 1-5.

Geary, et al., "Dragonfly Directional Sensor", SPIE, Optical Engineering, vol. 52, Feb. 2013, 9 Pages.

Alter, et al., "Introduction to Fiber Optic Imaging", SCHOTT North America, Feb. 2007, 93 Pages.

International Search Report and Written Opinion for application No. PCT/US2016/063245 dated Mar. 2, 2017.

"SEEOR: Evanescently Coupled Non-mechanical Beam Steering", Vescent Photonics, 2015 [retrieved on Sep. 2, 2016 ], <URL: http://www.vescent.com/wp-content/uploads/2015/04/LS-1uJ7.1.pdf>.

Keller et al., "Emerging Liquid Crystal Waveguide Technology for Low SWaP Active Short Wave Infrared Imagers", Proc. of SPIE, vol. 9384, pp. 1-9, 2015.

* cited by examiner

VARIABLE MAGNIFICATION ACTIVE IMAGING SYSTEM

BACKGROUND

Focal Plane Arrays (FPAs) generally include a two-dimensional array of detector elements, or unit cells (i.e., pixels), organized in rows and columns. A circuit within each unit cell of the FPA accumulates charge corresponding to the flux of incident radiation at a photodetector within the unit cell. Typically, the charge within the unit cell is accumulated at a capacitive element which produces a voltage proportional to the accumulated charge. The voltage corresponds to the intensity of the flux over a given time period referred to as the integration period (or integration interval). The resulting voltage is conveyed by additional circuitry to an output of the array, and may be used to construct an image of a scene that emitted the radiation. In some instances, such a voltage or charge can be digitized by circuitry of the focal plane array resulting in binary values, at least one value for each unit cell of the focal plane array. Accordingly, some focal plane arrays may be used to convert a two-dimensional pattern of flux into a two-dimensional array of binary values, resulting in a digital image.

SUMMARY OF THE INVENTION

Aspects and embodiments are generally directed to imaging systems and methods, and in particular to imaging systems and methods which include solid-state active optical elements for improved weight reduction and reduced power consumption for high-resolution imaging and long-range imaging. In various aspects and embodiments, the imaging systems discussed herein may include an optical scanning subsystem configured to direct optical radiation over an area of a scene to be imaged, and a detection subsystem configured to activate a portion of a Focal Plane Array (FPA) in a selected pattern during an integration period, the activated portion of the FPA corresponding to the area of the scene illuminated by the optical scanning system. As further discussed below, the imaging systems may further include an adaptive polymer lens assembly, or similar solid-state active optical element, positioned at an aperture shared by the optical scanning subsystem and the detection subsystem, and configured to adjust an optical magnification of the imaging system. Accordingly, various aspects and embodiments provide a reduced weight, size, and power consumption imaging system for ground, mobile, maritime, airborne, and space, imaging environments.

At least one aspect is directed to an imaging system. In an embodiment the imaging system includes a detection subsystem including a focal plane array (FPA) coupled to a read-out integrated circuit (ROIC), the ROIC being configured to activate a portion of the FPA in a selected pattern during an integration period, an optical scanning subsystem including an optical source and a waveguide, the waveguide being configured to direct optical radiation generated by the optical source within a field of view (FOV) of the detection subsystem and over an area of a scene to be imaged, the portion of the FPA activated in the selected pattern corresponding to the area of the scene to be imaged, and an adaptive polymer lens assembly positioned at an aperture of the imaging system shared by the detection subsystem and the optical scanning subsystem, the adaptive polymer lens assembly being configured to adjust an optical magnification of the scene to be imaged.

In an embodiment, the FPA includes a plurality of unit cells and the selected pattern is a pattern of individual unit cells, and the ROIC is configured to activate individually each unit cell of the plurality of unit cells in the portion of the FPA according to the pattern of individual unit cells. In one embodiment, the waveguide is configured to direct the optical radiation synchronously over the area of the scene to be imaged that corresponds to the individually activated unit cells, and not over an area of the scene to be imaged that corresponds to inactive unit cells.

According to an embodiment, the FPA includes a plurality of unit cells and the selected pattern includes a first group of unit cells and a second group of unit cells, the first group of unit cells being spatially separated from the second group of unit cells by inactive unit cells. In a further embodiment, the waveguide is configured to direct the optical radiation over at least the area of the scene to be imaged that corresponds to the first group of unit cells and the second group of unit cells during a single frame of the detection subsystem, and not over an area of the scene to be imaged that corresponds to the inactive unit cells. In one embodiment, the ROIC is further configured to activate the first group of unit cells for a first duration, and activate the second group of unit cells for a second duration within the single frame of the detection subsystem.

In an embodiment, the imaging system further includes a controller in electrical communication with the detection subsystem, the optical scanning subsystem, and the adaptive polymer lens assembly, and the controller is configured to dynamically adjust the selected pattern. According to one embodiment, the controller is configured to receive a user command specifying the area of the scene to be imaged, and dynamically adjust the selected pattern responsive to receiving the user command. In a further embodiment, the specified area of the scene to be imaged includes a section of the scene outside of the FOV of the detection subsystem, and the adaptive polymer lens assembly is configured to automatically expand the FOV of the detection subsystem from a first FOV to a second FOV to include the specified area of the scene to be imaged.

In an embodiment, the optical radiation includes one of a fan beam and a spot beam, the waveguide is further configured to control a width of beam divergence of the optical radiation along a first axis, and the adaptive polymer lens assembly is further configured to control a width of beam divergence of the optical radiation along a second axis substantially perpendicular to the first axis. According to one embodiment, the selected pattern includes a plurality of groups of unit cells, each group being assigned a priority relative to other groups of the plurality, and the waveguide and ROIC are synchronized such that the ROIC activates the groups of unit cells during the integration period based at least in part on the assigned priority, and the waveguide illuminates sections of the area of the scene to be imaged corresponding to the activated groups based at least in part on the assigned priority.

According to one embodiment, the detection subsystem and the optical scanning subsystem are configured to operate in accordance with a search and track image acquisition and generation technique, the waveguide and ROIC are synchronized such that waveguide scans the FOV of the detection subsystem during a searching mode of operation to identify a target, and during a tracking mode of operation illuminates an area of the scene to be imaged corresponding to the target. In an embodiment, the waveguide is a solid-state liquid crystal waveguide, and the optical source includes one of a visible light source, a short-wave infrared (SWIR) light source, a near infrared (NIR) light source, and a Laser light source.

According to an aspect, provided is a method of generating an image. In one embodiment, the method includes directing optical radiation generated by an optical source of an optical scanning subsystem over an area of a scene to be imaged to illuminate the area of the scene, activating a portion of a focal plane array (FPA) of a detection subsystem in a selected pattern during an integration period of the FPA, the portion of the FPA corresponding to the area of the scene illuminated, and adjusting an optical magnification of the scene to be imaged with an adaptive polymer lens assembly positioned at an aperture shared between the detection subsystem and optical scanning subsystem.

In an embodiment, the selected pattern includes a pattern of individual unit cells of the FPA, and activating the portion of the FPA in the selected pattern includes activating individually each unit cell of the plurality of unit cells according to the pattern of individual unit cells. According to one embodiment, directing optical radiation over the area of the scene to be imaged includes illuminating at least the area of the scene to be imaged that corresponds to the individually activated unit cells, and not an area of the scene that corresponds to inactive unit cells.

According to one embodiment, the selected pattern includes a first group of unit cells and a second group of unit cells, the first group of unit cells being spatially separated from the second group of unit cells by inactive unit cells, and directing optical radiation over the area of the scene to be imaged includes illuminating at least the area of the scene to be imaged that corresponds to the first group of unit cells and the second group of unit cells. In an embodiment, the method further includes receiving a user command specifying the area of the scene to be imaged, and dynamically adjusting the selected pattern includes dynamically adjusting the selected pattern responsive to receiving the user command. In one embodiment, the specified area of the scene to be imaged includes a section of the scene outside of a field of view (FOV) of the detection subsystem, and adjusting the optical magnification of the scene to be imaged includes automatically expanding the FOV of the detection subsystem from a first FOV to a second FOV to include the specified area of the scene to be imaged.

According to an aspect, provided is an imaging system. In one embodiment, the imaging system includes a focal plane array (FPA), a read-out integrated circuit (ROIC) coupled to the FPA, the ROIC being configured to activate a portion of the FPA in a first selected pattern during a first integration period and activate the portion of the FPA in a second selected pattern during a second integration period, an optical scanning subsystem including an optical source and a waveguide in electrical communication with the ROIC, the waveguide being configured to direct optical radiation generated by the optical source over a first area of a scene to be imaged that corresponds to the portion of the FPA activated in the first selected pattern and over a second area of the scene to be imaged that corresponds to the portion of the FPA activated in the second selected pattern, and an adaptive polymer lens positioned at an aperture of the imaging system, the adaptive polymer lens assembly being configured to adjust an optical magnification of the scene to be imaged.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment. Various aspects and embodiments described herein may include means for performing any of the described methods or functions.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Figure 1:
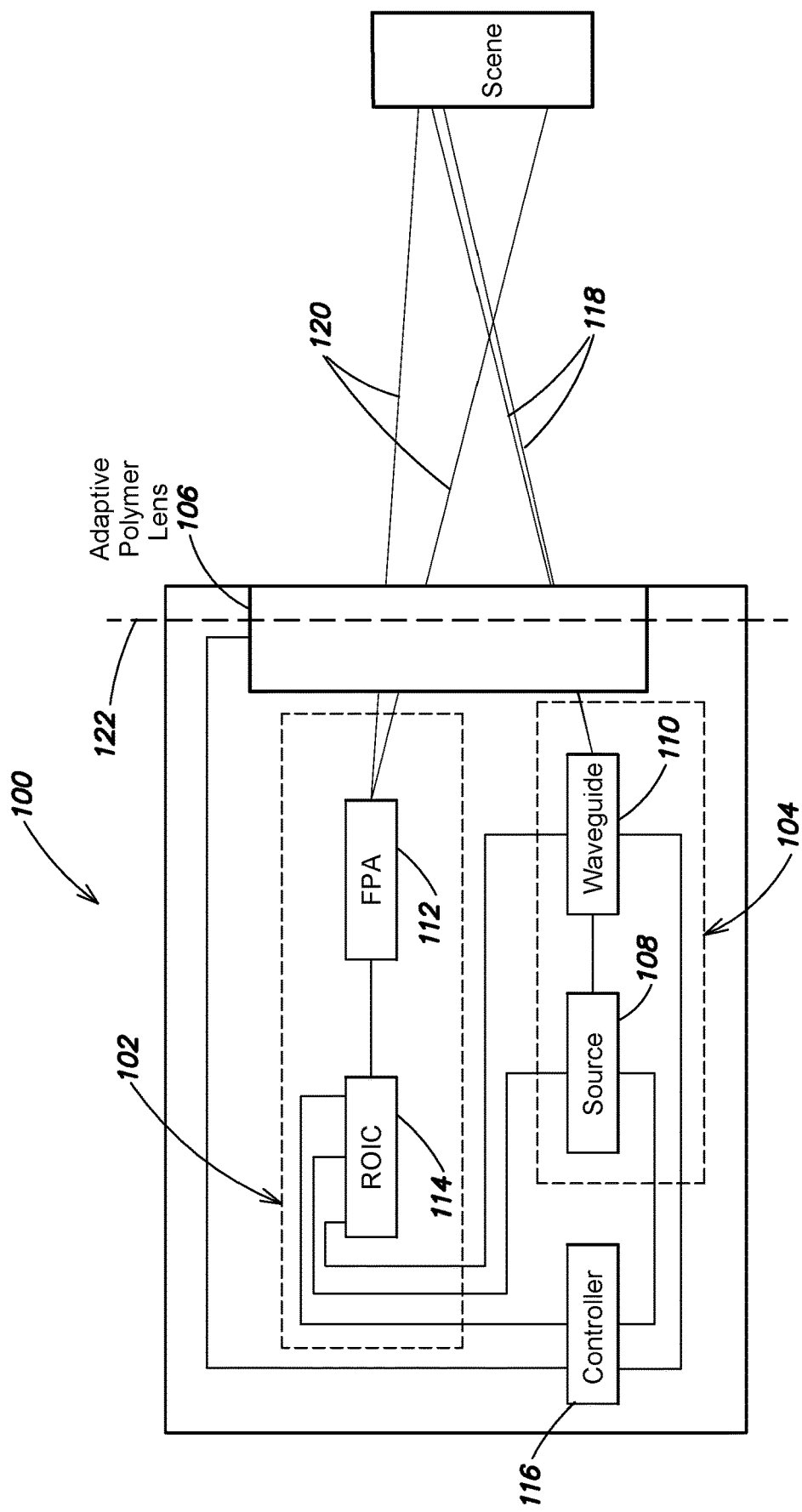
FIG. 1 is a block diagram of an example imaging system according to aspects of the invention.

Aspects and embodiments relate to imaging systems and methods of using the same. In particular, aspects and embodiments are directed to active solid-state imaging systems and methods, and more specifically, to an active solid-state imaging system having a reduced size, weight, and power consumption, when compared to conventional imaging systems.

Embodiments of the imaging systems described herein include an optical scanning subsystem configured to direct optical radiation over an area of a scene to be imaged, and a detection subsystem configured to activate a portion of a Focal Plane Array (FPA) in a selected pattern during an integration period, the activated portion of the FPA corresponding to the area of the scene illuminated. Optical radiation reflected from the scene and received by the activated portion of the FPA may be used to construct an image of the scene. As further discussed below, the detection subsystem may include a Read-Out Integrated Circuit (ROIC) configured to activate the portion of the FPA corresponding to the area of the scene to be imaged in the selected pattern, the selected pattern being less than the entire array of unit cells of the FPA. Various embodiments may also include an adaptive polymer lens assembly positioned at an aperture between the scanning subsystem and the detection subsystem and configured to rapidly adjust an optical magnification of the imaging system in real-time.

The ability of an imaging system to accurately image a scene and generate a high-resolution image is generally dependent on the sensitivity of the detector (e.g., the FPA), and the intensity of the optical radiation emitted by an illumination source. In various conventional approaches to generating an image, the illumination source is positioned to illuminate the entire scene within a Field of View (FOV) of the FPA. Such an approach not only consumes a great deal of power when providing the intensity of illumination necessary for high-contrast imaging at long ranges, it makes power management challenging during long-range imaging.

Conventional solutions to these problems have suggested employing large power optical sources and complicated mechanical zoom assemblies to modify the FOV of the FPA, and to achieve the desired performance. Other conventional approaches have suggested positioning beamforming optics on a gimbal system, which would allow the system to perform rolling-shutter imaging techniques to reduce power consumption. However, with these conventional solutions, the cost and weight of the imaging system significantly increases, making mobile, maritime, airborne, and space applications much less practical.

Accordingly, various implementations of the improved imaging system described herein are configured to steer optical radiation generated by an optical source to illuminate a section of a scene to be imaged, and synchronously activate a portion of the FPA that corresponds to that section of the scene illuminated. In various embodiments, the improved imaging system may also include an adaptive polymer lens assembly configured to automatically and dynamically adjust a magnification of the improved imaging system to accommodate imaging a section of the scene outside of a current FOV of the imaging system. Accordingly, various aspects and embodiments reduce the size, weight, and power consumption of conventional imaging systems by activating only a portion of the FPA at any given time, providing improved practicality for mobile, maritime, airborne, and space applications, among others.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

FIG. 1 is a block diagram of an example imaging system in accordance with various aspects and embodiments discussed herein. Among other components, the imaging system 100 may include a detection subsystem 102, an optical scanning subsystem 104, and an adaptive polymer lens assembly 106. Each of the detection subsystem 102 and optical scanning subsystem 104 may include various components in optical and/or electrical communication. As shown, the optical scanning subsystem 104 may include an optical source 108, and a waveguide 110 coupled between the optical source 108 and the adaptive polymer lens assembly 106. In various embodiments, the detection subsystem 102 may include an FPA 112 and a ROIC 114. The ROIC 114 may be coupled directly or indirectly to the FPA 112, the optical source 108, and the waveguide 110, as shown in FIG. 1. In various further embodiments, the imaging system 100 may further include control electronics such as a controller 116 coupled with the ROIC 114, the optical source 108, the waveguide 110, and the adaptive polymer lens assembly 106. For instance, in FIG. 1, the controller 116 is shown interposed between the detection subsystem 102 and the optical scanning subsystem 104.

In various embodiments, the optical source 108 is in optical communication with the waveguide 110 and configured to generate and transmit a beam of optical radiation of a predetermined optical wavelength. The optical source 108 may include any suitable source of optical radiation, such as a SWIR (short-wave infrared) light source, a NIR (near-infrared) light source, a laser light source, or a visible light source. In one embodiment, optical radiation generated by the optical source 108 is coherent, and the system 100 includes one or more collimating optics.

As FIG. 1 shows, in certain embodiments the waveguide 110 is positioned to receive the transmitted beam of optical radiation from the optical source 108. For example, the waveguide 110 may receive the transmitted beam of optical radiation via an optical fiber or free space coupling. Responsive to receiving the optical radiation, the waveguide 110 may be controlled to direct the optical radiation generated by the optical source 108 over the area of the scene to be imaged that corresponds to the portion of the FPA 112 that is activated. This may include directing the optical radiation over a section of the scene that is less than the entire span of the scene. In particular, the waveguide 110 may control the beamsteering of the optical radiation such that the beam of optical radiation is defined by a shape substantially corresponding to a selected pattern of activated unit cells of the FPA 112. For example, the waveguide 110 may adjust a width of the beam of optical radiation in a direction substantially parallel to a plane at which the scene is positioned.

In FIG. 1, the beam of optical radiation is illustrated by lines 118, and the FOV of the detection subsystem is illustrated by lines 120. As FIG. 1 shows, in certain embodiments the waveguide 110 is configured to the direct optical radiation within a section of a field of view (FOV) of the detection subsystem 102. That is, in various embodiments the illuminated area of the scene may be less than the entire FOV of the detection subsystem 102. As also shown in FIG. 1, in some implementations, the FOV of the detection subsystem 102 may not cover the entire span of the scene to be imaged. Accordingly, in various embodiments of the waveguide 110 of FIG. 1 may be configured to adjust the direction of the optical radiation responsive to one or more controls, such as a control to adjust the FOV of the detection subsystem 102. As discussed in further detail below, the waveguide 110 may be controlled to transmit the optical radiation to the adaptive polymer lens assembly 106 as a "fan" beam or a "spot" beam. In one example, a "fan" beam includes a beam of optical radiation having a narrow beamwidth in one dimension (e.g., a horizontal direction), and a wider beamwidth in another dimension (e.g., a vertical direction). In contrast, a "spot" beam may include a beam of optical radiation having a concentrated area of substantially uniform shape.

In various embodiments, the waveguide 110 includes a solid-state waveguide, and in particular, includes a solid-state liquid crystal waveguide. For example, the solid-state liquid crystal waveguide may receive the transmitted beam via a fiber coupling from the optical source 108, and continuously scan the radiation over a range of up to 30° by 5°. In one example, the solid-state liquid crystal waveguide includes a Steerable Electro-Evanescent Optical Reflector offered by Vescent Photonics, Inc. of Golden, Colo. In one embodiment, the waveguide 110 may be coupled and in electrical communication with the ROIC 114 of the detection subsystem 102 and/or the controller 116. For example, the controller 116 of various embodiments may be configured to apply a control voltage (e.g., an analog control voltage) to the waveguide 110 to adjust a refractive index of the waveguide 110, and adjust the beamsteering of the waveguide 110.

In contrast to conventional beamsteering approaches, which typically require beamforming optics positioned on a pivoted support structure to accurately direct optical radiation, examples of the waveguide 110 discussed herein remove the need for such gimbaled structures. Furthermore, the waveguide 110 may be controlled to direct optical radiation generated by a single optical source (e.g., the optical source 108) over the area of the scene to be imaged that corresponds to the activated portion of the FPA 112. Such an implementation avoids the need for multiple optical sources to selectively illumination a desired FOV, as required by other conventional beamsteering approaches. As discussed above, additional optical sources can significantly increase the weight and cost of the optical system. Accordingly, in addition to the various technical advantages discussed above, the waveguide 110 of various aspects and embodiments improves the speed and accuracy of the imaging system 100, as well as reduces the overall weight of the system 100, when compared to conventional approaches.

In various embodiments, the FPA 112 of the detection subsystem 102 includes a plurality of individual detector elements, which may be arranged in one or more rows or columns. In particular, detector elements may be referred to as unit cells or pixels. When activated, each unit cell of the FPA 112 is designed to collect and integrate photons of light impinging on the unit cell. A circuit within each unit cell of the FPA 112 accumulates charge corresponding to the flux of incident optical radiation during the integration period. In one implementation, each unit cell of the FPA 112 may include a complementary metal-oxide semiconductor (CMOS) sensor or a charge coupled device (CCD). In some embodiments, charge-injection devices (CIDs) may also be used for unit cells.

In various embodiments, the ROIC 114 is in optical and electrical communication with the FPA 112, and in particular, each unit cell of the FPA 112. The ROIC 114 is configured to activate, individually and/or in predetermined groups, unit cells of the FPA 112 during the integration period. In particular, the ROIC 114 of various embodiments is configured to activate unit cells of the FPA 112 in a selected pattern. The selected pattern of various embodiments may include a pattern of individual unit cells, groupings of individual unit cells, a pattern corresponding to a search and track function, a pattern corresponding to a raster pattern, and/or a pattern corresponding to a user defined area of the scene to be imaged. In other implementations, the selected pattern of unit cells may correspond to an area of a scene that is outside an area to be avoided during imaging. Selected patterns of activated unit cells of the FPA 112 of various embodiments are further discussed below with reference to FIGS. 3A-3B. In various embodiments, the selected pattern of activated unit cells is less than the entire array of unit cells of the FPA 112. In particular, the selected pattern may be dynamically and automatically generated by the controller 116 and/or in various embodiments, user provided.

While discussed herein as arranged in one or more rows or columns, various embodiments of the FPA 112 shown in FIG. 1 may include unit cells arranged in any suitable pattern. Further, the FPA 112 may include any number of unit cells such as a 2048×2048 array, a 320×256 array, or a 640×480 array. In certain embodiments, the width of the beam of optical radiation steered by the waveguide 110 may correspond to the dimensions of the FPA 112, or the dimensions of a unit cell within the FPA 112. Furthermore, the speed of any given scan performed by the waveguide 110 may be controlled relative the width of the beam of optical radiation and the dimensions of the FPA 112, and/or individual unit cells within the FPA 112. For example, small optical beamwidths may require faster scanning relative to large beamwidths. "Row" and "column" as used herein, may be interchanged according to various embodiments. That is, although "row" may generally be used to refer to a horizontal positioning (i.e., an x-direction in a Cartesian coordinate system) and "column" may generally be used to refer to a vertical positioning (i.e., a y-direction in a Cartesian coordinate system), as used herein either may be used to refer to a horizontal positioning and a vertical positioning relative to the other.

In various embodiments, the optical scanning subsystem 104, and in particular the waveguide 110, is configured to synchronously direct optical radiation over an area of the scene to be imaged that corresponds to the activated unit cells. While in one embodiment, the ROIC 114 is configured to activate one or more unit cells of the FPA 112 in the selected pattern responsive to direction of the optical radiation by the waveguide 110, in certain other embodiments, the optical radiation may be directed by the waveguide 110 responsive to activation of the unit cells in the selected pattern. In particular, the ROIC 114 may be configured to generate a synchronization signal based at least in part on the selected pattern, and transmit the synchronization signal to the controller 116 and/or optical scanning subsystem 104. In various other embodiments, the controller 116 may generate a synchronization signal, and transmit the synchronization signal to the optical scanning subsystem 104 and the ROIC 114. Accordingly, while in one embodiment the ROIC 114 may be configured to activate a portion of the FPA 112 in a selected pattern according to a synchronization signal from the controller 116, in various other embodiments the waveguide 110 may be configured to direct optical radiation to a corresponding area of the scene based on a synchronization signal from the ROIC 114, and/or the controller 116.

In certain embodiments, the synchronization signal received by one, or both, of the ROIC 114 and optical scanning subsystem 104 corresponds to a frame rate of the detection subsystem 102. The frame rate of the detection subsystem 102 refers to the snapshot operation of each individual unit cell of the FPA 112, and the frequency at which the imaging system 100 generates consecutive images (i.e., frames). The synchronization signal received by one, or both, of the ROIC 114 and optical scanning subsystem 104 may be triggered by frame rate to align the optical scanning subsystem 104 with the detection subsystem 102. That is, in certain embodiments a synchronization signal may be generated at the beginning of a frame interval of a given frame.

After the expiration of the integration period, the ROIC 114 is configured to deactivate each unit cell of the selected pattern and read out a value for each deactivated unit cell.

Each read out value may be transmitted to other components of the imaging system 100 and used to construct an image of the illuminated area of the scene. In certain embodiments, the integration period may be about the same as the frame interval of a frame of the detection subsystem 102. In particular, the duration of the integration period and the duration of time it takes to read-out the unit cells of the FPA, may be substantially equal to the duration of one frame of operation. Such an embodiment may be advantageous in low flux conditions where unit cells may be activated for a longer duration. However, in various other embodiments, the integration period may be substantially less than the frame interval of a frame of operation of the detection subsystem 102. Such an embodiment may be advantageous when flux conditions are high. In such an embodiment, the ROIC 114 may activate a portion of the FPA 112 in the selected pattern during a fraction of the frame interval, and the unit cells of the FPA 112 may be configured to hold the stored charge for the remainder of the frame interval. Accordingly, in certain embodiments the ROIC may be configured to activate each unit cell of the selected pattern for a different duration, the same duration, or any combination thereof. For example, the ROIC 114 may be configured to activate unit cells of a first group within the selected pattern for a first duration, and activate a second group of unit cells within the selected for a second duration. Durations of activations may be dynamically selected by the controller 116 or ROIC 114 based on the flux level of radiation received. In one example, a 30 Hz frame rate of operation of the system 100 may correspond to a 32 ms integration period.

In various embodiments, the adaptive polymer lens assembly 106 is positioned at an aperture shared between the optical scanning subsystem 104 and the detection subsystem 102, and configured to adjust a magnification of the optical system 100. For example, the aperture of the system 100 may be positioned at ghost line 122. In particular, the adaptive polymer lens assembly 106 is configured to simultaneously modify a magnification of the optical scanning subsystem 104 and the detection subsystem 102. While shown in FIG. 1 as including a single adaptive polymer lens, in various embodiments the adaptive polymer lens assembly 106 may include more than one lens. Furthermore, while in various embodiments the adaptive polymer lens assembly 106 may be positioned at an aperture shared between the optical scanning subsystem 104 and the detection subsystem 102, in various other embodiments the adaptive polymer lens assembly 106 may be positioned at an aperture of the detection subsystem 102, and disposed at a distance from an aperture of the optical scanning subsystem 104.

Responsive to receiving one or more commands from the controller 116, the adaptive polymer lens assembly 106 may be configured to rapidly and automatically adjust the magnification of the optical system 100 such that the FOV of the detection subsystem 102 includes the area of the scene to be imaged. In various embodiments, the adaptive polymer lens assembly 106 includes a lens fabricated from a flexible membrane, the curvature of which can be rapidly modified to adjust the optical magnification of the adaptive polymer lens assembly 106. The flexible lens may be supported by one or more support structures, such as support rings, which apply a constant pressure to the flexible lens.

In various embodiments the optical magnification of the adaptive polymer lens assembly 106 is adjusted by applying a linear compression to the flexible membrane to change a radius of curvature of the flexible membrane. In particular, the adaptive polymer lens assembly 106 may include a first flexible membrane and a second flexible membrane having a fluid dispersed in-between. The linear pressured from the support structures changes the fluid pressure within the core of the adaptive polymer lens assembly 106 (i.e., between the first support structure and the second support structure), which changes the curvature of the adaptive polymer lens assembly 106. In various embodiments, the adaptive polymer lens assembly 106 is in electrical communication with the controller 116 and adapted to adjust the magnification of the optical system responsive to receiving one or more commands from the controller 116. Such embodiments permit active control of beam divergence from the optical source 108 of various embodiments.

As discussed above, the optical radiation received at the adaptive polymer lens assembly 106 may include a "fan" beam or a "spot" beam. Accordingly, in some embodiments the adaptive polymer lens assembly 106 may control the divergence of the optical radiation, in other embodiments the adaptive polymer lens assembly 106 may convert the optical radiation to a "fan" beam, and in still other embodiments it may simply expand or reduce the optical radiation. For example, the adaptive polymer lens assembly 106 may include Powell lens configured to provide a "fan" beam. In an embodiment where the optical radiation includes a "fan" beam provided by the waveguide 110, the optical scanning subsystem 104 may be configured to scan in a single direction based on a frame interval of the frame rate of the system 100. For example, the waveguide 110 may be configured to control a width of beam divergence of the optical radiation along a first axis (e.g., in a vertical direction relative to the scene to be imaged), and the adaptive polymer lens assembly 106 is configured to control a width of beam divergence of the optical radiation along a second axis (e.g., in a horizontal direction relative to the scene to be imaged), substantially perpendicular to the first axis. In contrast, in an embodiment where the optical radiation includes a "spot" beam, the optical scanning subsystem 104 may illuminate the portion of the scene to be imaged in a two-dimensional pattern.

In contrast to conventional imaging systems which may include one or more mechanical zoom assemblies, such as sliding lenses or drop in afocal assemblies, the adaptive polymer lens assembly 106 of various embodiments provides rapid magnification adjustment without any moving parts. Furthermore, such a lens assembly in combination with the waveguide 110 offers significant benefits when compared to other non-mechanical beamsteering schemes, such as optical phased arrays (OPAs). For instance, conventional imaging systems require multiple OPAs to permit near-continuous, or customizable, scanning across a FOV. Because OPAs are discrete scanning devices, the range and adaptability of the imaging system is largely limited by the number and diversity of OPAs included within the system. Accordingly, the adaptive polymer lens assembly 106 of various examples permits active control of optical radiation without the increased size, weight, and power requirement restrictions of conventional imaging systems which include OPAs. Furthermore, the adaptive polymer lens assembly 106 permits high speed scanning which is often practically challenging with multiple OPAs.

Referring again to FIG. 1, in various embodiments the imaging system 100 may include a controller coupled and in electrical communication with the adaptive polymer lens assembly 106, components of the optical scanning subsystem 104, and components of the detection subsystem 102. For example, the controller 116 may be in electrical communication with the ROIC 114, the optical source 108, and the waveguide 110, of various embodiments. The controller 116 may include a single controller; however, in various other embodiments the controller 116 may consist of a plurality of controllers and/or control circuitry. While the controller 116 is illustrated separate from one or more components of the imaging system 100, in various embodiments, the controller 116 may be combined with one or more other components, such as the ROIC 114. For instance, the controller 116, ROIC 114, and other combined components of the imaging system 100 may include a combination of software-configured elements, control circuitry, signal processing circuitry, application specific integrated circuitry, radio-frequency integrated circuitry, or any combination of various hardware and logic circuitry for performing the various processes discussed herein. For instance, the controller 116 of various embodiments may include a processor core, memory, and programmable input/output components. The controller 116 may be configured to automatically and/or dynamically control various components of the imaging system 100, such as the adaptive polymer lens assembly 106 or the waveguide 110.

Figure 2:
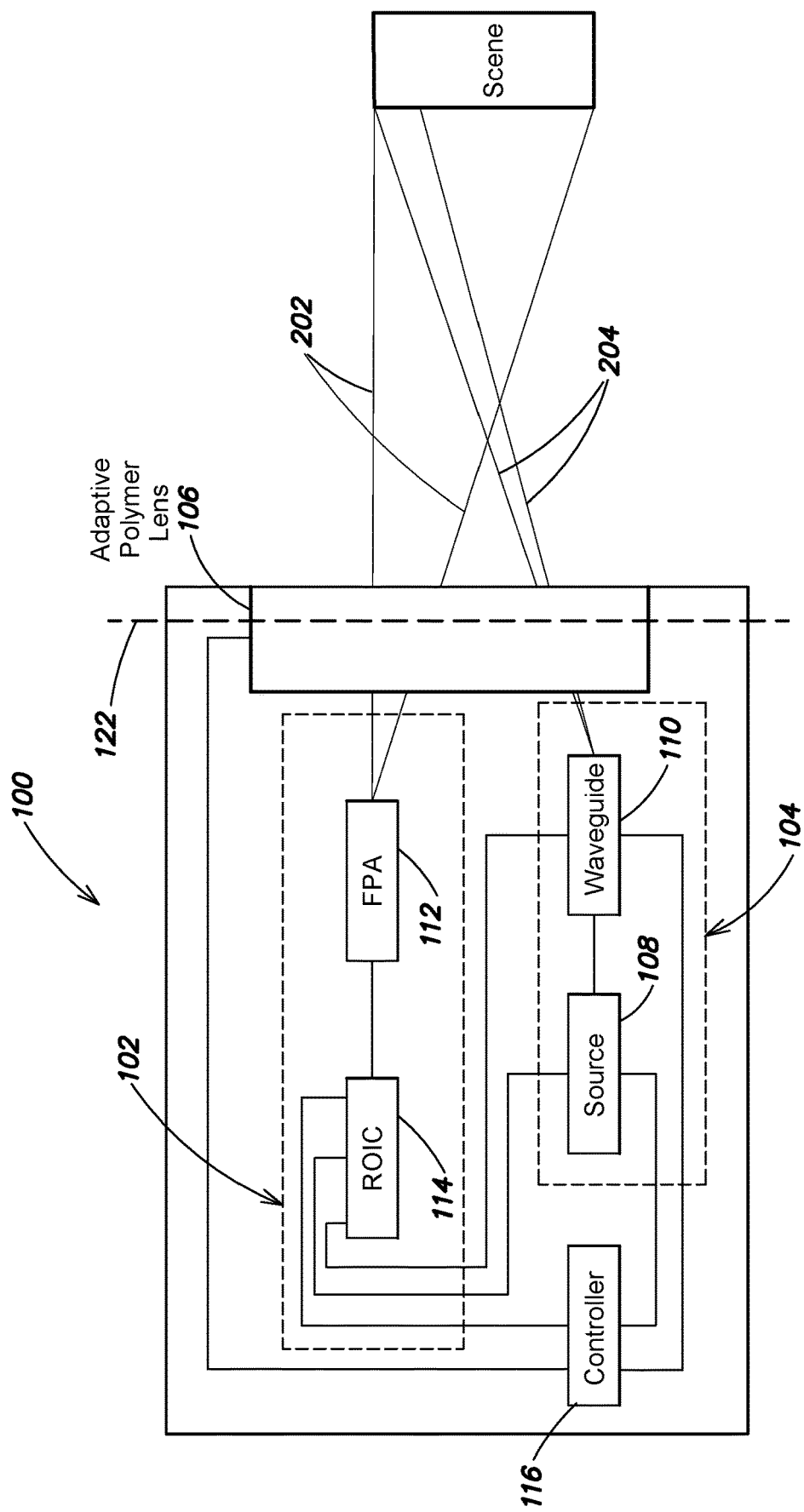
FIG. 2 is a further illustration of the example imaging system shown in FIG. 1, according to aspects of the invention.

In particular, in various embodiments an input/output component of the controller 116, such as a user interface, is configured to receive an input specifying an area of the scene to be imaged. For instance, the user interface may accept information from an external input source, such as a button, switch, keyboard, trackball, joystick, touch screen, mouse device, or any other suitable external input device. In various embodiments, responsive to receiving the user input, the controller 116 is configured to dynamically adjust the selected pattern of unit cells to correspond to the user specified area of the scene. In at least one embodiment, the controller 116 may be further configured to automatically and/or dynamically control the adaptive polymer lens assembly 106 expand the FOV of the detection subsystem 102 from a first FOV to a second FOV to include the specified area of the scene. For example, FIG. 2 shows a further illustration of the example imaging system 100 shown in FIG. 1, in which the FOV of the detection subsystem 102 has been expanded to include the area of the scene specified by the user not previously within the FOV. In FIG. 2, the expanded FOV of the detection subsystem 102 is illustrated by lines 202 and the expanded divergence of the optical radiation is illustrated by lines 204.

In various embodiments, the controller 116 is adapted to generate and deliver a control signal (i.e., command) to the adaptive polymer lens assembly 106 to adjust the magnification setting of the adaptive polymer lens assembly 106 to expand the FOV of the detection subsystem 102 as shown in FIG. 2. In various embodiments, such an embodiment permits rapid adjustments to the FOV of the detection subsystem 102, and in particular, rapid adjustments in real-time. Rapid expansion or narrowing of the FOV of the detection subsystem 102 allows the optical radiation reflected from the area of the scene to be imaged to be received at the activated portion of the FPA 112 corresponding to the area specified by the user. In contrast to various conventional imaging schemes, such aspects and embodiments greatly improve the versatility of the imaging system 100. In particular embodiments, rapid control and adjustments of the waveguide 110 and adaptive polymer lens assembly 106, and corresponding activation of unit cells of the FPA 112, permits imaging multiple areas of a scene to be imaged within a single frame of operation. Such embodiments are further discussed with reference to the example illustrations of operation of the imaging system 100 shown in FIGS. 3A-3B.

Figure 3A:
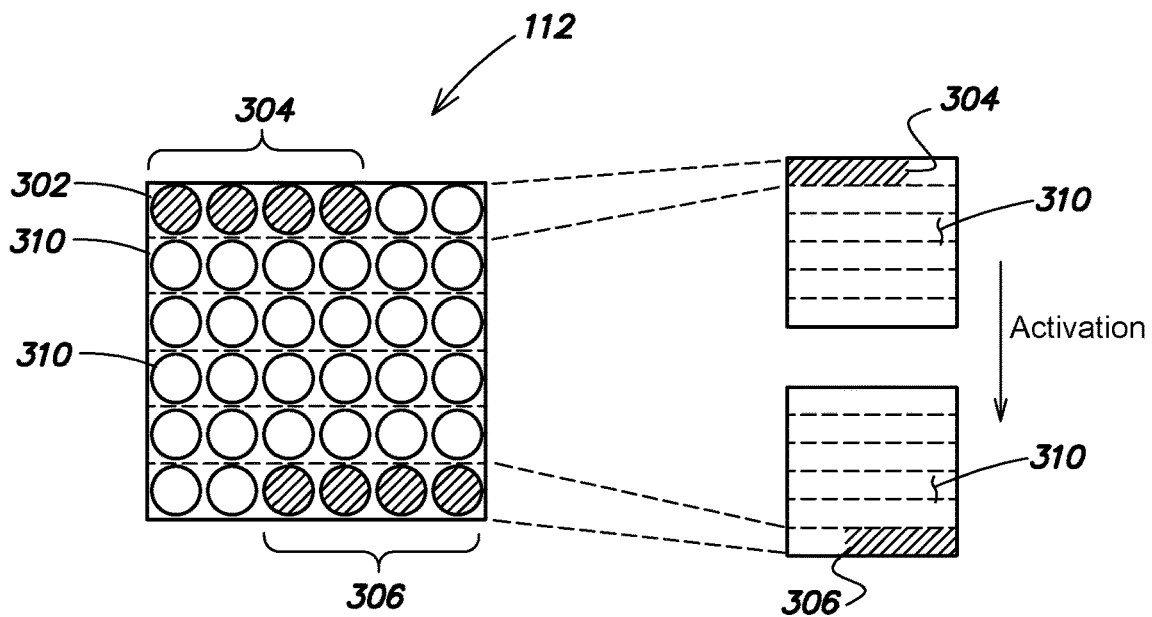
FIGS. 3A-3B are example illustrations of operation of the imaging system shown in FIG. 1, according to aspects of the invention.
Figure 3B:
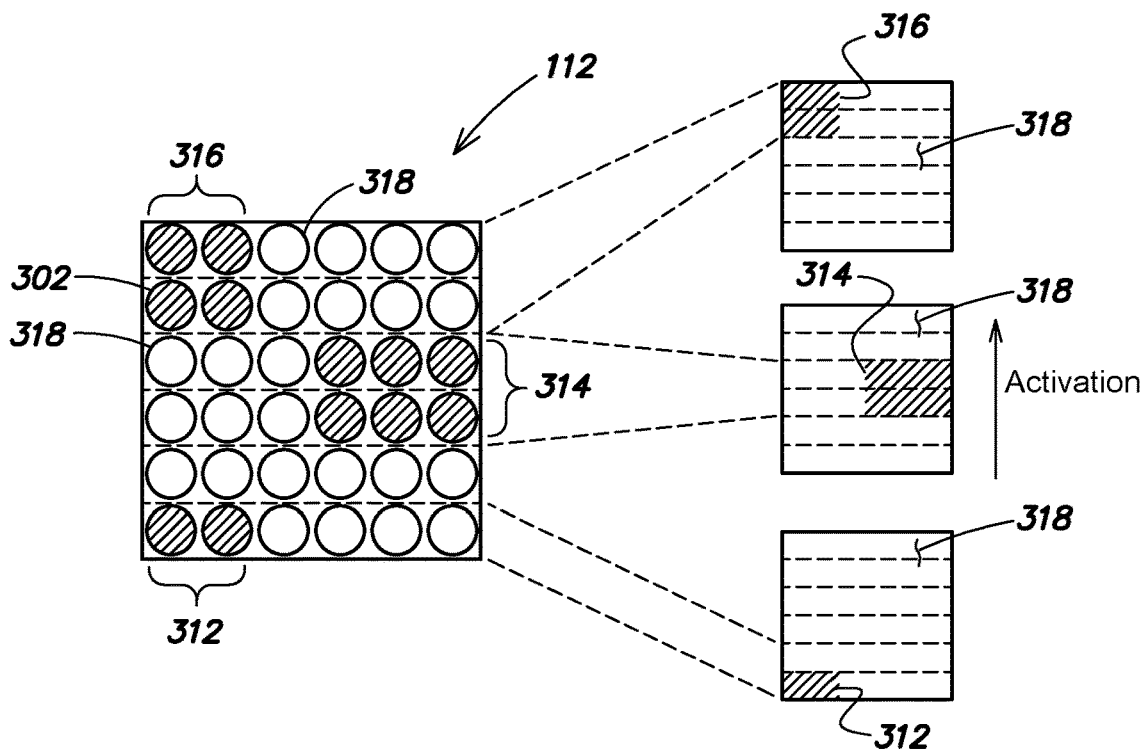

FIG. 3A shows a first operation of the imaging system illustrated in FIG. 1, according to various embodiments. FIGS. 3A-3B are described with continuing reference to the imaging system 100 of FIG. 1. As discussed above, the FPA 112 may include a plurality of unit cells arranged in rows and columns. The ROIC 114 of various embodiments is adapted to activate individual unit cells of the FPA 112 according to the selected pattern and corresponding to the area of the scene illuminated by the optical scanning subsystem 104. In FIGS. 3A-3B, activated unit cells are indicated by hashed lines (e.g., active unit cell 302). In various embodiments, the selected pattern includes an arrangement of individual unit cells including a first group 304 of unit cells and a second group 306 of unit cells. Each group of unit cells may include at least one unit cell.

As shown, the first and second groups 304, 306 of unit cells may be separated by a plurality of inactive unit cells (shown generally as 310). Accordingly, the activated portion of the FPA 112 (e.g., the first group 304 and second group 306) may be less than the entire array of unit cells. In such embodiments, the waveguide 110 is configured to illuminate the area of the scene that corresponds to the first group 304 of unit cells and the second group 306 of unit cells, and avoid illuminating the area of the scene that corresponds to the inactive unit cells 310. In contrast to conventional rolling-shutter imaging techniques which activate lines of unit cells across an array in a row by row fashion, various aspects and embodiments of the ROIC 114 discussed herein are configured to activate individual unit cells independently, and "skip" unit cells not within the selected pattern. That is, in various embodiments the ROIC 114 is configured to activate unit cells within the first group 304, skip the inactive unit cells 310, and activate unit cells within the second group 306. Such an operation not only significantly improves efficiency; it allows activation of multiple areas of the FPA 112 within a single frame of operation.

In certain embodiments, the optical scanning subsystem 104 is configured to direct optical radiation at, and illuminate, the area of the scene that corresponds to the first group 304 of unit cells and the second group 306 of unit cells. Accordingly, the ROIC 114 may be configured to individually and sequentially activate each unit cell of the first group 304 and/or the second group 306 of unit cells; however, in various other embodiments, the ROIC 114 may be configured to activate each unit cell within the group simultaneously, or in any other suitable configuration. Responsive to activation of the first group 304, the ROIC 114 is configured to activate the second group 306 of unit cells, as shown in FIG. 3A. In doing so, the ROIC 114 is configured to skip from the first group 304 of unit cells to the second group 306 of unit cells. Simultaneously, the optical scanning subsystem 104 of various embodiments is configured to direct optical radiation to illuminate the area of the scene that corresponds to the second group 306 of unit cells. As discussed above, such operations may be performed within a single frame of operation and provide improved efficiency, power consumption, and speed, when compared to the row-by-row rolling-shutter approaches of various conventional schemes.

Turning now to FIG. 3B, shown is a second operation of the imaging system 100 illustrated in FIG. 1. As shown, in various embodiments, the ROIC 114 may be configured to activate multiple groupings of unit cells (e.g., a first group 312, a second group 314, and a third group 316) of the FPA 112 during the integration period, each grouping of unit cells separated by a plurality of inactive unit cells (shown generally as 318). As shown, each group of unit cells may span multiple rows and/or columns within the FPA 112. During operation, the ROIC 114 may be configured to skip between each group of unit cells as an area of the scene corresponding to each group of unit cells is illuminated. While shown in FIG. 3A as skipping from an upper left portion of the FPA 112 to a lower right portion of the FPA 112, and in FIG. 3B from a lower left portion of the FPA 112, to a middle portion of the FPA 112, to a upper left portion of the FPA 112, the ROIC 114 of various embodiments may be configured to activate unit cells of one or more groups in any order according to the selected pattern. That is, in various embodiments the ROIC 114 may activate unit cells from top to bottom, bottom to top, left to right, right to left, or in any other directional order.

In at least one embodiment, the individual groups of unit cells within a selected pattern may be assigned a priority relative to other groups of individual unit cells. While in one embodiment, priority may be assigned by the controller 116 based on locations or importance; in other embodiments, the controller 116 may assign priority based on any other suitable factor. In such an embodiment, the waveguide 110 and the ROIC 114 are synchronized such that the waveguide 110 activates the portion of the FPA in the selected pattern based on the assigned priorities. For example, with reference to FIG. 3B, the first group 312 of unit cells may be assigned a first priority, the second group 314 of unit cells may be assigned a second priority, and the third group 316 of unit cells may be assigned a third priority. In this arrangement, the ROIC is adapted to activate the first group 312 first, the second group 314 next, and the third group 316 last, and the waveguide 110 is configured to direct optical radiation to a corresponding area of the scene in the same order.

As discussed above, in various embodiments the ROIC 114 may be adapted to activate individual unit cells of the FPA 112 according to a selected pattern including a raster scan pattern. In such an embodiment, the optical scanning subsystem 104 is adapted to direct optical radiation and illuminate an area of the scene to be imaged corresponding to the activated portion of the FPA 112 during the raster scan pattern. In particular, such embodiments of the ROIC 114 may be configured to activate a group of unit cells of the FPA 112 in a raster pattern, the group of unit cells being less than the entire array of the FPA 112. In the raster scanning pattern, the ROIC 114 is configured to activate individually unit cells within the group of unit cells sequentially within one or more horizontal strips (i.e., scan lines). For instance, with reference to FIG. 3B, the ROIC 114 may be adapted to sweep left to right to activate individual elements in the first group 312 of unit cells, then sweep left to right to activate individual elements in the second group 314 of unit cells, and subsequently sweep left to right to activate individual elements in the third group 316 of unit cells. In various embodiments, the ROIC 114 continues sequential activation of the unit cells until the entire selected pattern of unit cells is activated. As discussed above, the waveguide 110 is configured to direct the optical radiation generated by the optical source 108 over each area of the scene corresponding to the activated portion of the FPA 112 during the raster scan selected pattern. Accordingly, in contrast to conventional raster scanning techniques, in various embodiments the imaging system 100 is configured to perform a raster scan pattern over an area of a scene to be imaged that corresponds to an activated group of unit cells of the FPA 112, the group of unit cells of the FPA 112 being less than the entire array of unit cells.

As discussed herein, various selected patterns of unit cell activation may include patterns of individual unit cells, groupings of individual unit cells, patterns corresponding to a search and track function, patterns corresponding to a raster pattern, and patterns corresponding to a user defined area of the scene to be imaged. In various embodiments, the ROIC 114 may be adapted to rapidly switch from a first selected pattern to a second selected pattern of activating unit cells. Transitions may be automatic or responsive to a user input (e.g., user specification of an area of the scene to be imaged). For example, the ROIC 114 may be configured to activate a portion of the FPA 112 in a first selected pattern, such as the pattern shown in FIG. 3A, during a first integration period, and activate the portion of the FPA 112 in a second selected pattern, such as that shown in FIG. 3B, during a second integration period. Rapid transitions allow the system 100 to quickly adapt to and adjust imaging operations when conditions or applications change. In such an embodiment, the waveguide 110 may be configured to direct the optical radiation generated by the optical source 108 over a first area of a scene to be imaged that corresponds to the portion of the FPA 112 activated in the first selected pattern, and over a second area of the scene to be imaged that corresponds to the portion of the FPA 112 activated in the second selected pattern.

Returning to FIG. 1, various aspects and embodiments of the example imaging systems discussed herein may be constructed for an air-based platform. In various embodiments, the air-based platform may include a projectile including a propulsion system, such as a missile. In such embodiments, the imaging system 100 may be part of a seeker target imaging system for target acquisition, target tracking, and/or target identification. In some embodiments, the air-based platform may be an unmanned aerial vehicle (UAV) and the imaging system 100 may be an imaging system that is configured for imaging and surveillance. Accordingly, in various embodiments, the detection subsystem 102 and the optical scanning subsystem 104 may be configured to operate in accordance with a search and track image acquisition and generation technique. In a search and track mode of operation the waveguide 110 and ROIC 114 are synchronized such that waveguide 110 scans the FOV of the detection subsystem 102 during a searching mode of operation to identify a target, and illuminates the area of the scene to be imaged corresponding to the target and the activated portion of the FPA 112 during a tracking mode of operation. For instance, the searching mode of operation may correspond to a wide FOV of the detection subsystem 102, and the tracking mode of operation may correspond to a narrow FOV of the detection subsystem 102. In further embodiments, the searching mode of operation may be initiated by receipt of an input identifying an intended target.

Figure 4:
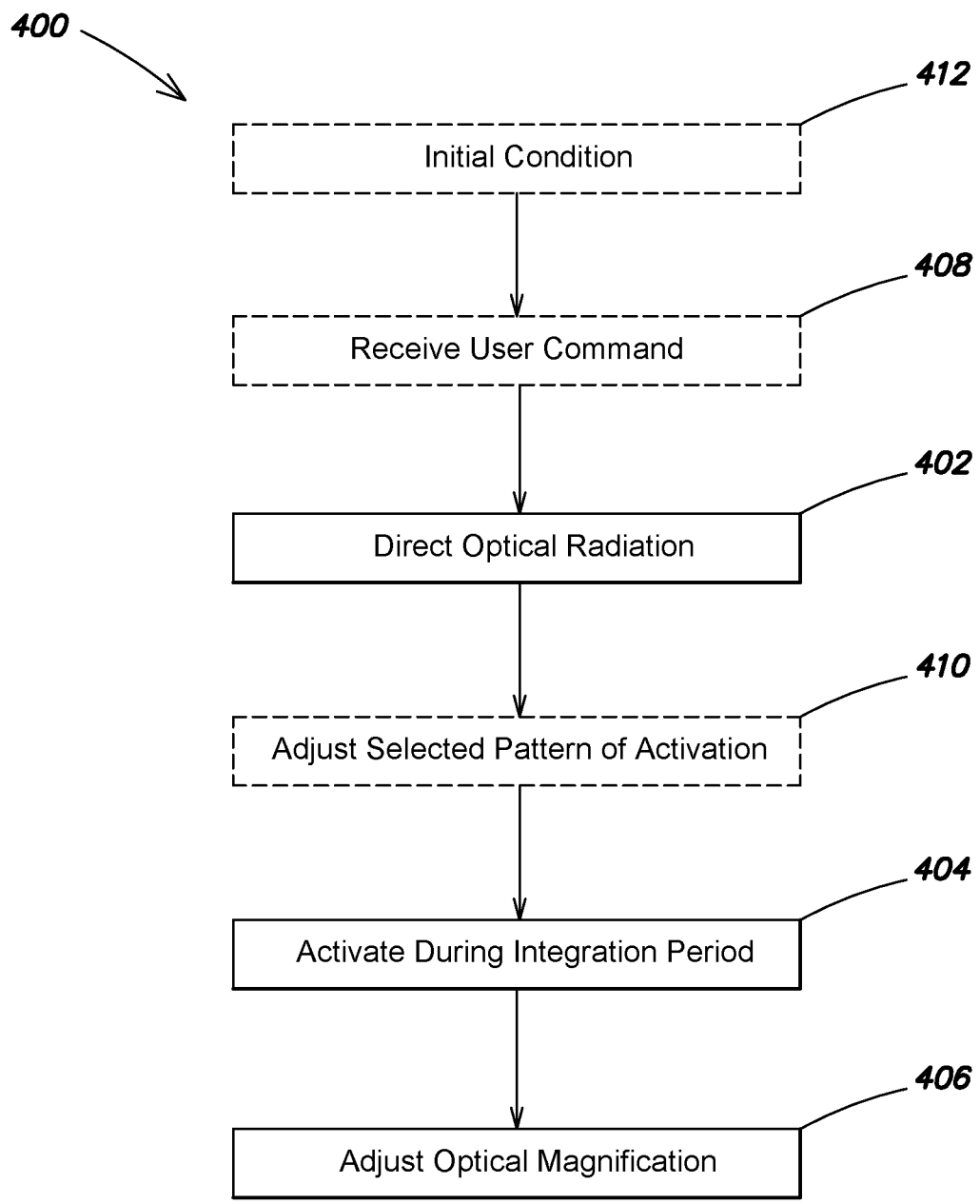
FIG. 4 is an example process flow according to aspects of the invention.

As described above with reference to FIGS. 1-3B, several embodiments perform processes that improve known schemes for imaging. In some embodiments, these processes are executed by an imaging system, such as the imaging system 100 described above with reference to FIGS. 1-2 and 3A-3B. One example of such a process is illustrated in FIG. 4. According to this example, the process 400 may include the acts of directing optical radiation at an area of a scene to be imaged, activating a portion of a FPA corresponding to the area of the scene to be imaged, and adjusting an optical magnification of the imaging system. In various embodiments, the process 400 may further include receiving a user command specifying the area of the scene to be imaged, and adjusting a selected pattern of activation of the portion of the FPA.

In various embodiments, the imaging system described with reference to at least FIG. 4 begins the process 400 at an initial condition (shown as ghost box 412). For instance, the initial condition may include an initial FOV, an initial selected pattern of activation, and an initial area of a scene to be imaged. Such initial conditions serve as a starting point for the acts discussed below. It is appreciated that in certain embodiments acts 402-410 may be performed in the order discussed below. However, in various other embodiments, acts 402-410 may be performed in any other suitable order and each act may be performed for any suitable number of iterations. That is, in at least one embodiment, the process 400 may begin by adjusting an optical magnification of a scene to be imaged (act 406), or dynamically adjusting a selected pattern of activation (act 410).

In various embodiments, the process 400 includes directing optical radiation generated by an optical source of an optical scanning subsystem over an area of a scene to be imaged to illuminate the area of the scene (act 402). This may include directing optical radiation over the area of the scene to be imaged that corresponds to an activated portion of an FPA of a detection subsystem. In various embodiments, responsive to receiving optical radiation generated by the optical source, a waveguide is controlled to direct the optical radiation over the area of the scene, as discussed above. Accordingly, act 402 may include directing the optical radiation over a section of the scene that is less than the entire span of the scene. In particular, act 402 may include illuminating an area of the scene that is less than an entire FOV of the detection subsystem. In various embodiments, controlling the waveguide to direct the optical radiation over the area of the scene may include applying a control voltage to the waveguide to adjust a refractive index of the waveguide and adjust the beamsteering of the optical radiation.

In act 404, the process 400 may include activating the portion of the FPA in a selected pattern during an integration period, the activated portion of the FPA corresponding to the area of the scene illuminated by the optical scanning subsystem. As discussed above with reference to FIG. 1, in various embodiments the FPA may include an array of unit cells arranged in one or more rows or columns. Accordingly, act 404 may include individually activating each unit cell of the plurality of unit cells within the portion of the FPA according to the selected pattern of individual unit cells. As discussed herein, in various embodiments the portion of the FPA is less than the entire array of unit cells of the FPA. In particular, the process 400 may include activating, with a ROIC, individually and/or in predetermined groups, unit cells of the FPA during the integration period. The selected pattern of various embodiments may include a pattern of individual unit cells, groupings of individual unit cells, a pattern corresponding to a search and track function, a pattern corresponding to a raster scan pattern, and/or a pattern corresponding to a user defined area of the scene to be imaged.

While in one embodiment activating the portion of the FPA in a selected pattern may be performed responsive to directing the optical radiation over the area of the scene to be imaged, in various other embodiments, directing the optical radiation over the area of the scene may be performed responsive to activating the portion of the FPA in the selected pattern. For example, in one embodiment, activating the portion of the FPA in the selected pattern may include generating a synchronization signal based at least in part on the selected pattern, and transmitting the synchronization signal to the optical scanning subsystem and/or the controller. In such an embodiment, the optical scanning subsystem may be configured to illuminate an area of the scene based on the received signal. However, in various other embodiments, directing the optical radiation over an area of the scene to be imaged may include generating a synchronization signal based at least in part on the illuminated area of the scene. In such an embodiment, the process 400 may include transmitting a synchronization signal from the controller and/or optical scanning subsystem to the ROIC to synchronize activation of the portion of the FPA based on the received signal. Further still, in other embodiments, the process 400 may include the act of generating a synchronization signal at the controller, and transmitting the synchronization signal to the waveguide and the ROIC simultaneously. Accordingly, while in one embodiment the process 400 may include activating a portion of the FPA in a selected pattern according to a synchronization signal from the controller and/or optical scanning subsystem, in various other embodiments the process 400 may include directing optical radiation to a corresponding area of the scene based on a synchronization signal received from the ROIC.

As discussed above, in various embodiments activating the portion of the FPA in the selected pattern may include activating the portion of the FPA according to a pattern of individual unit cells, groupings of individual unit cells, a pattern corresponding to a search and track function, a pattern corresponding to a raster scan pattern, and/or a pattern corresponding to a user defined area of the scene to be imaged. In contrast to conventional rolling-shutter imaging techniques which activate lines of unit cells across an array in a row by row fashion, various aspects and embodiments of the process 400 include activating individual unit cells independently, and "skipping" unit cells not within the selected pattern. That is, in various embodiments the process 400 includes activating unit cells within a first group, skipping inactive unit cells, and activating unit cells within a second group. Such an operation not only significantly improves efficiency; it allows activation of multiple areas of the FPA within a single frame of operation. In various embodiments, act 404 may include individually and sequentially activating each unit cell of the first group and/or the second group of unit cells; however, in various other embodiments, act 404 may include activating each unit cell within the group simultaneously, or in any other suitable arrangement.

Turning now to act 406, the process 400 may include adjusting an optical magnification of the scene to be imaged with an adaptive polymer lens assembly positioned at an aperture shared between the detection subsystem and the optical scanning subsystem. In various embodiments, the adaptive polymer lens assembly is in electrical communication with the controller and act 406 includes adjusting the magnification of the optical system responsive to receiving one or more commands from the controller. In various embodiments, the optical magnification of the adaptive polymer assembly lens is adjusted by applying a linear compression to a flexible membrane of the adaptive polymer lens assembly to change a radius of curvature of the flexible membrane. In one example, adjusting the optical magnification of the scene may include expanding the FOV of the detection subsystem from a first FOV to a second FOV to include a user specified area of the scene to be imaged. In such an embodiment, the process 400 may include receiving a user command specifying the area of the scene to be imaged (shown in FIG. as act 408). In such an embodiment, the process 400 may include dynamically adjusting the selected pattern responsive to receiving the user command to include those unit cells corresponding to the user specified area of the scene (shown as act 410).

In various embodiments, after the expiration of the integration period, the process 400 may include deactivating each unit cell of the selected pattern and reading out a value for each deactivated unit cell of the selected pattern. Each read out value may be transmitted to other components of the imaging system and used to construct an image of the observed scene. While not illustrated in FIG. 4, process 400 may include various additional acts performed by components of the imaging system 100 discussed above with reference to FIG. 1. Such processes are discussed above with reference to FIG. 1.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. An imaging system comprising:
   a detection subsystem including a focal plane array (FPA) coupled to a read-out integrated circuit (ROIC), the FPA including a plurality of unit cells, wherein the ROIC is configured to activate, individually and independently, each unit cell in a portion of the plurality of unit cells in a selected pattern of individual unit cells during an integration period;
   an optical scanning subsystem including an optical source and a solid-state liquid crystal waveguide, the solid-state liquid crystal waveguide being configured to steer a beam of optical radiation generated by the optical source within a field of view (FOV) of the detection subsystem and synchronously over an area of a scene to be imaged that corresponds to the individually and independently activated unit cells in the selected pattern of individual unit cells, and not over an area of the scene that corresponds to inactive unit cells of the plurality of unit cells; and
   an adaptive polymer lens assembly positioned at an aperture of the imaging system shared by the detection subsystem and the optical scanning subsystem such that the beam of optical radiation generated by the optical source and reflected optical radiation from the scene to be imaged both pass through the adaptive polymer lens assembly, the adaptive polymer lens assembly being configured to simultaneously adjust an optical magnification of the optical scanning subsystem and the detection subsystem.

2. The imaging system according to claim 1, wherein the selected pattern of individual unit cells includes a first group of unit cells and a second group of unit cells, the first group of unit cells being spatially separated from the second group of unit cells by the inactive unit cells.

3. The imaging system according to claim 2, wherein the solid-state liquid crystal waveguide is configured to steer the beam of optical radiation over at least the area of the scene to be imaged that corresponds to the first group of unit cells and the second group of unit cells during a single frame of the detection subsystem.

4. The imaging system according to claim 3, wherein the ROIC is further configured to activate the first group of unit cells for a first duration, and activate the second group of unit cells for a second duration within the single frame of the detection subsystem.

5. The imaging system according to claim 1, further comprising a controller in electrical communication with the detection subsystem, the optical scanning subsystem, and the adaptive polymer lens assembly, wherein the controller is configured to dynamically adjust the selected pattern of individual unit cells.

6. The imaging system according to claim 5, wherein the controller is configured to receive a user command specifying the area of the scene to be imaged, and dynamically adjust the selected pattern of individual unit cells responsive to receiving the user command.

7. The imaging system according to claim 6, wherein the specified area of the scene to be imaged includes a section of the scene outside of the FOV of the detection subsystem, and wherein the adaptive polymer lens assembly is configured to automatically expand the FOV of the detection subsystem from a first FOV to a second FOV to include the specified area of the scene to be imaged.

8. The imaging system according to claim 1, wherein the beam of optical radiation includes one of a fan beam and a spot beam, wherein the solid-state liquid crystal waveguide is further configured to control a width of beam divergence of the beam of optical radiation along a first axis, and wherein the adaptive polymer lens assembly is further configured to control a width of beam divergence of the beam of optical radiation along a second axis substantially perpendicular to the first axis.

9. The imaging system according to claim 1, wherein the selected pattern of individual unit cells includes a plurality individual unit cells arranged in a plurality of groups, each group being assigned a priority relative to other groups of the plurality of groups, and wherein the solid-state liquid crystal waveguide and ROIC are synchronized such that the ROIC activates the groups of unit cells during the integration period based at least in part on the assigned priority, and the solid-state liquid crystal waveguide illuminates sections of the area of the scene to be imaged corresponding to the activated groups based at least in part on the assigned priority.

10. The imaging system according to claim 1, wherein the detection subsystem and the optical scanning subsystem are configured to operate in accordance with a search and track image acquisition and generation technique, wherein the solid-state liquid crystal waveguide and ROIC are synchronized such that solid-state liquid crystal waveguide scans the FOV of the detection subsystem during a searching mode of operation to identify a target, and during a tracking mode of operation illuminates an area of the scene to be imaged corresponding to the target.

11. The imaging system according to claim 1, wherein the optical source includes one of a visible light source, a short-wave infrared (SWIR) light source, a near infrared (NIR) light source, and a Laser light source.

12. A method of generating an image, the method comprising:
   directing a beam of optical radiation generated by an optical source of an optical scanning subsystem through an adaptive polymer lens assembly and over an area of a scene to be imaged to illuminate the area of the scene;
   activating, individually and independently, each unit cell in a portion of a plurality of unit cells of a focal plane array (FPA) included in a detection subsystem, the portion of the plurality of unit cells being activated in a selected pattern of individual unit cells during an integration period of the FPA, wherein the individually and independently activated unit cells correspond to the area of the scene illuminated by the beam of optical radiation, and a plurality of inactive unit cells of the plurality of unit cells of the FPA corresponding to an area of the scene that is not illuminated by the beam of optical radiation;

receiving reflected optical radiation from the area of the scene illuminated by the beam of optical radiation at the FPA via the adaptive polymer lens assembly, the adaptive polymer lens assembly being positioned at an aperture shared between the detection subsystem and the optical scanning subsystem; and simultaneously adjusting an optical magnification of the optical scanning subsystem and the detection subsystem with the adaptive polymer lens assembly.

13. The method according to claim 12, wherein the selected pattern of individual unit cells includes a first group of unit cells and a second group of unit cells, the first group of unit cells being spatially separated from the second group of unit cells by the plurality of inactive unit cells, and wherein directing the optical radiation over the area of the scene to be imaged includes illuminating at least the area of the scene to be imaged that corresponds to the first group of unit cells and the second group of unit cells.

14. The method according to claim 13, further comprising receiving a user command specifying the area of the scene to be imaged, and dynamically adjusting the selected pattern of individual unit cells responsive to receiving the user command.

15. The method according to claim 14, wherein the specified area of the scene to be imaged includes a section of the scene outside of a field of view (FOV) of the detection subsystem, and wherein adjusting the optical magnification of the detection subsystem includes automatically expanding the FOV of the detection subsystem from a first FOV to a second FOV to include the specified area of the scene to be imaged.

16. An imaging system comprising:
a focal plane array (FPA) including a plurality of unit cells;
a read-out integrated circuit (ROIC) coupled to the FPA, the ROIC being configured to activate, individually and independently, each unit cell in a first portion of the plurality of unit cells in a first selected pattern of individual unit cells during a first integration period, the ROIC being further configured to activate, individually and independently, each unit cell in a second portion of the plurality of unit cells in a second selected pattern of individual unit cells during a second integration period;
an optical scanning subsystem including an optical source and a solid-state liquid crystal waveguide in electrical communication with the ROIC, the solid-state liquid crystal waveguide being configured to steer a beam of optical radiation generated by the optical source synchronously over a first area of a scene to be imaged that corresponds to the individually and independently activated unit cells of the first selected pattern, and synchronously over a second area of the scene to be imaged that corresponds to the individually and independently activated unit cells of the second selected pattern, and not over an area of the scene that corresponds to inactive unit cells of the plurality of unit cells; and an adaptive polymer lens assembly positioned at an aperture of the imaging system shared by the FPA and the optical scanning subsystem such that the beam of optical radiation generated by the optical source and reflected optical radiation from the scene to be imaged at the FPA both pass through the adaptive polymer lens assembly, the adaptive polymer lens assembly being configured to simultaneously adjust an optical magnification of the optical scanning subsystem and the FPA.

17. The imaging system according to claim 1, wherein the selected pattern of individual unit cells includes a first group of unit cells and a second group of unit cells, the first group of unit cells being spatially separated from the second group of unit cells by the inactive unit cells, wherein the ROIC is configured to skip from the first group of unit cells to the second group of unit cells, wherein the first group of unit cells is included in a first row of the FPA including a first portion of the inactive unit cells, and wherein the second group of cells is included in a second row of the FPA including a second portion of the inactive unit cells.

18. The imaging system according to claim 17, wherein at least one of the first group of unit cells or the second group of unit cells includes an additional row of the FPA including a third portion of the inactive unit cells.

19. The imaging system according to claim 1, wherein the selected pattern of individual unit cells includes a first group of unit cells and a second group of unit cells, the first group of unit cells being spatially separated from the second group of unit cells by the inactive unit cells, wherein the ROIC is configured to skip from the first group of unit cells to the second group of unit cells, wherein the first group of unit cells is included in a first column of the FPA including a first portion of the inactive unit cells, and wherein the second group of cells is included in a second column of the FPA including a second portion of the inactive unit cells.

20. The imaging system according to claim 19, wherein at least one of the first group of unit cells or the second group of unit cells includes an additional column of the FPA including a third portion of the inactive unit cells.

* * * * *